United States Patent
Moslehi et al.

(10) Patent No.: US 8,402,834 B1
(45) Date of Patent: Mar. 26, 2013

(54) FIBER OPTIC PRESSURE SENSOR BASED ON DIFFERENTIAL SIGNALING

(75) Inventors: Behzad Moslehi, Los Altos, CA (US); Joannes M. Costa, Rancho La Costa, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 478 days.

(21) Appl. No.: 12/705,353

(22) Filed: Feb. 12, 2010

(51) Int. Cl.
*G01L 11/02* (2006.01)

(52) U.S. Cl. .......................................... 73/705

(58) Field of Classification Search ............ 73/700–756
See application file for complete search history.

(56) References Cited

U.S. PATENT DOCUMENTS

| | | | |
|---|---|---|---|
| 4,670,649 A * | 6/1987 | Senior et al. ............. | 250/227.21 |
| 4,932,262 A | 6/1990 | Wlodarczyk | |
| 5,005,584 A | 4/1991 | Little | |
| 5,372,044 A * | 12/1994 | Pierre et al. ................... | 73/800 |
| 5,438,873 A * | 8/1995 | Wlodarczyk et al. ........... | 73/705 |
| 6,450,037 B1 * | 9/2002 | McGuinn et al. ............... | 73/705 |
| 7,047,816 B2 | 5/2006 | Jones et al. | |
| 7,155,074 B2 | 12/2006 | Kersey | |
| 7,266,261 B2 | 9/2007 | Arias Vidal et al. | |
| 7,308,165 B2 | 12/2007 | Arias Vidal et al. | |
| 7,447,390 B2 | 11/2008 | Dunphy et al. | |
| 7,458,273 B2 | 12/2008 | Skinner et al. | |
| 7,554,666 B2 * | 6/2009 | Russell .................. | 356/450 |
| 7,966,887 B2 * | 6/2011 | Knobloch et al. ............... | 73/705 |
| 8,176,790 B2 * | 5/2012 | Birch et al. ..................... | 73/705 |
| 2003/0159518 A1 * | 8/2003 | Sawatari et al. ................ | 73/705 |
| 2011/0048136 A1 * | 3/2011 | Birch et al. ..................... | 73/705 |

* cited by examiner

*Primary Examiner* — Andre Allen
(74) *Attorney, Agent, or Firm* — File-EE-Patents.com; Jay A. Chesavage (57) ABSTRACT

A temperature correcting pressure gauge which has a substrate having at least one surface coupled to a source of pressure to be measured, the substrate first surface having a first fiber Bragg grating from a first optical fiber attached in an appropriately sensitive region of the substrate, a fiber Bragg grating from a second optical fiber attached to the opposite surface from the first fiber Bragg grating, the first and second fiber Bragg gratings reflecting or transmitting optical energy of decreasing or increasing wavelength, respectively, in response to an applied pressure. The first and second fiber Bragg gratings have nominal operating wavelength ranges that are adjacent to each other but are exclusive ranges and the fiber Bragg gratings also have closely matched pressure coefficients and temperature coefficients.

18 Claims, 7 Drawing Sheets

*Figure 1*
Differential Pressure Transducer
Prior Art

*Figure 2*
Single-ended Pressure Transducer
Prior Art

*Figure 3*
Single-ended Pressure Transducer

*Figure 4*
Transducer Detail A

*Figure 5*
Wavelength Interrogator

*Figure 6*
Sine Filter Characteristics

*Figure 7*
Wavelength Interrogator

*Figure 8A*
Single Fiber Sensor

*Figure 8B*
Single Fiber Interrogator

*Figure 9A*
Double Ended Sensor

*Figure 9B*
Double Ended Sensor Interrogator
(Redundancy Operation)

*Figure 11*

FIBER OPTIC PRESSURE SENSOR BASED ON DIFFERENTIAL SIGNALING

FIELD OF THE INVENTION

The present invention relates to a pressure sensor. In particular, the invention relates to a temperature-compensated pressure sensor using fiber optic fiber Bragg gratings applied to opposite surfaces of a substrate.

BACKGROUND OF THE INVENTION

Figure 1:
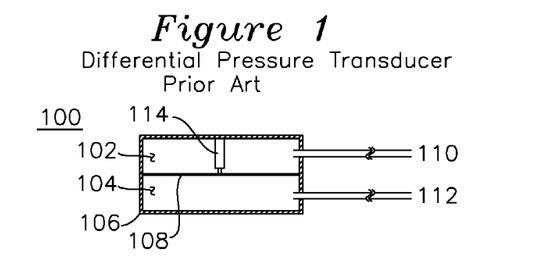
FIG. 1 shows a cross sectional diagram of a prior art pressure transducer.

FIG. 1 shows a prior art differential pressure transducer 100. A first pressure port couples into a first chamber 102, and a second pressure port couples to a second chamber 104. The differential pressure is thereby transferred to diaphragm 108 in the form of a displacement which is measured by displacement sensor 114.

Figure 2:
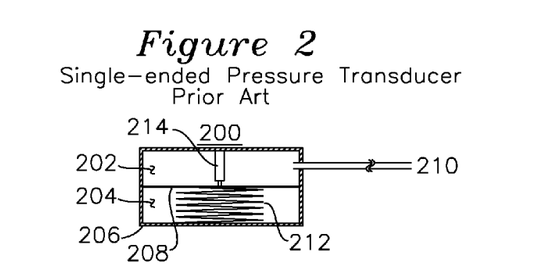
FIG. 2 shows a cross sectional diagram of a prior art single ended pressure transducer.

FIG. 2 shows a prior art single-ended pressure transducer 200, which has a pressure inlet 210 coupled to a first chamber 202 which includes generally rigid walls which surround diaphragm 208. A spring 212 provides a resistive pressure, or alternatively, chamber 204 may be filled with a non-hysteresis, temperature neutral fluid, or it may be opened to a neutral pressure environment compared to the pressure to be measured by inlet 210. Displacement sensor 214 measures the diaphragm 208 movement.

In higher pressure applications, the diaphragm 108 of FIG. 1 and diaphragm 208 of FIG. 2 may have a suitable thickness which provides a suitable modulus for the differential pressure in use.

A problem arises in pressure sensors and transducers which utilize fiber optic Bragg gratings, also known as fiber Bragg gratings (FBG), for displacement measurement where the fiber Bragg grating has response coefficients such that the FBG is responsive not only to pressure but also to temperature. This becomes a serious problem in oil and gas exploration, where temperature variations from 25 degrees C. to 200 degrees C. or more are not uncommon. In prior art pressure sensor systems, a per-transducer calibration characteristic has been stored, and a separate temperature sensor is used in combination with the strain reading to compensate for this temperature effect on the pressure measurement.

OBJECTS OF THE INVENTION

A first object of the invention is a differential pressure sensor having a substrate with a first pressure applied to one surface, a second pressure applied to a second surface opposite the first surface, and a first optical fiber with its fiber Bragg grating zone attached to a region of optimum deflection on the first surface, a second optical fiber with its fiber Bragg grating zone attached to the second surface opposite the first surface, a source of optical energy applied to the fiber Bragg gratings, and a wavelength interrogator for determination of pressure and temperature based on the reflected or transmitted wavelengths of the fiber Bragg gratings of the first and second optical fibers.

A second object of the invention is a pressure sensor having a substrate coupled to a source of pressure, the substrate having a first optical fiber with its Bragg grating zone located on a region of one surface of the substrate and a second optical fiber with its fiber Bragg grating zone located in a region on the opposite surface from the first optical fiber Bragg grating, the fiber Bragg gratings reflecting or transmitting applied optical energy such that an increase in applied pressure causes one fiber Bragg grating to reflect or transmit a longer wavelength and the other fiber Bragg grating to reflect or transmit a shorter wavelength.

A third object of the invention is a process for measurement of pressure applied to a substrate having fiber Bragg gratings on opposite surfaces and in the same region of the substrate, the fiber Bragg gratings operating in reflection mode or transmission mode, the fiber Bragg gratings having an optical source coupled to them in a series configuration, or independently, and a wavelength interrogator for conversion of reflected or transmitted wavelengths into pressure data.

SUMMARY OF THE INVENTION

A transducer substrate has a first surface with a first optical fiber having a first fiber Bragg grating zone attached in a measurement region, the substrate having a second surface opposite the first surface and having a second optical fiber having a second fiber Bragg grating zone attached in the same measurement region as the first fiber Bragg grating. The substrate first surface measurement region fiber Bragg grating is responsive to $\lambda 1$, and is formed on a first optical fiber, and a second optical fiber having a second fiber Bragg grating responsive to $\lambda 2$ is positioned opposite the first fiber Bragg grating. The first optical fiber Bragg grating has a first temperature coefficient $k1 = \Delta\lambda 1/\Delta T$ which is closely matched to a second optical fiber Bragg grating temperature coefficient $k2 = \Delta\lambda 2/\Delta T$. Additionally, one of the sensor fiber Bragg gratings is responsive to a wavelength which is slightly above or below the responsive wavelength of the other grating. Each of the sensor gratings generates a range of responses, and in the best mode of the invention, these range of responses are in separate ranges such that each response can be associated with a particular grating, however other embodiments of the invention may utilize fiber Bragg gratings with responses which include overlapping ranges. When a pressure is applied to the substrate, one fiber Bragg grating undergoes an incremental compression which lowers the response wavelength, and the other grating undergoes an incremental expansion which increases the response wavelength. A wavelength interrogator converts the first fiber Bragg grating response and the second fiber Bragg grating response into a pressure measurement.

DETAILED DESCRIPTION OF THE INVENTION

The present invention is a pressure sensor which may be operated in a single port mode, or a differential (two port) mode for detecting a pressure difference. The invention may be used or adapted for any pressure measuring purpose, including oil or gas exploration, aerospace, or any known application requiring measurement of pressure. The invention has the additional advantage that series strings of sensors may be placed along a single fiber, and the responses may be individually and concurrently read using a wavelength interrogator, or the responses may be time division multiplexed (TDM) and read sequentially.

Figure 3:
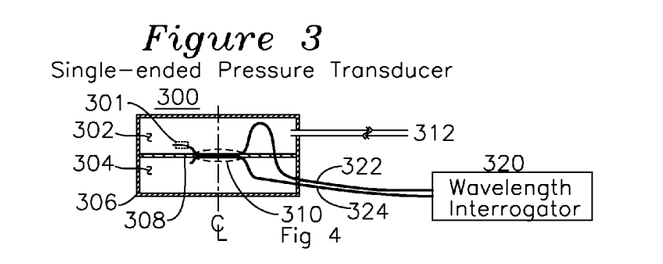
FIG. 3 shows a single ended pressure transducer according to the present invention.

FIG. 3 shows a single-ended pressure transducer 300 according to the present invention. A pressure to be measured enters port 312 and into chamber 302 which is separated from a second chamber 304 optionally containing a reference pressure by a transducer substrate 308 which separates the two chambers. In the single ended case, a pressure to be measured is coupled into one of the chambers 302 with a reference pressure applied to the other chamber 304 opposite the substrate 308. In the differential pressure sensing case, a first pressure and second pressure are provided to the chambers 302 and 304 on opposite sides of the substrate 308. Using the single-ended case of FIG. 3 as an example, an increase of pressure causes a small deflection in substrate 308. A wavelength interrogator 320 provides appropriate optical energies to first fiber 322 and second optical fiber 324, then optical energies are reflected by a first fiber Bragg grating located on first fiber 322 and also a second fiber Bragg grating located on second fiber 324, each fiber Bragg grating on opposite surfaces of substrate 308 and located in region 310. Each fiber Bragg grating is formed into the optical fiber over a finite extent known as a grating zone, or simply zone, here the grating zone is typically attached to the substrate's measurement region as the grating zone has very high sensitivity to strain and translates that strain into a shift in reflected or transmitted wavelength. The first optical fiber 322 reflects a particular wavelength $\lambda 1$ back to wavelength interrogator 320, and second optical fiber 324 similarly reflects a particular wavelength $\lambda 2$ back to interrogator 320. The first and second fiber Bragg gratings are positioned on opposite surfaces of a pressure substrate 308, preferably over a region of maximum deflection, with the first grating and second grating positioned directly over and under each other, and oriented in the same direction. In this arrangement, the temperature coefficient of the first grating and second grating cause the reflected wavelengths of each grating to offset in the same direction, such that a similar directional offset in wavelength related to the temperature change occurs for both sensors. The fiber Bragg gratings are attached to substrate 308 on opposite sides in any manner which minimizes hysteresis (also known as deflection memory, or creep). An optional temperature sensor (shown as 812 of FIG. 8A, or 912 and 913 of FIG. 9A) may be included in an unstressed zone of one or more of the fibers, or placed on a separate fiber, if desired, for a redundant temperature measurement. As will be described later, each of the sensors may have a transmission or reflection mode response which provides unique wavelength response regions, and provides for the estimation of both pressure and temperature.

Figure 4:
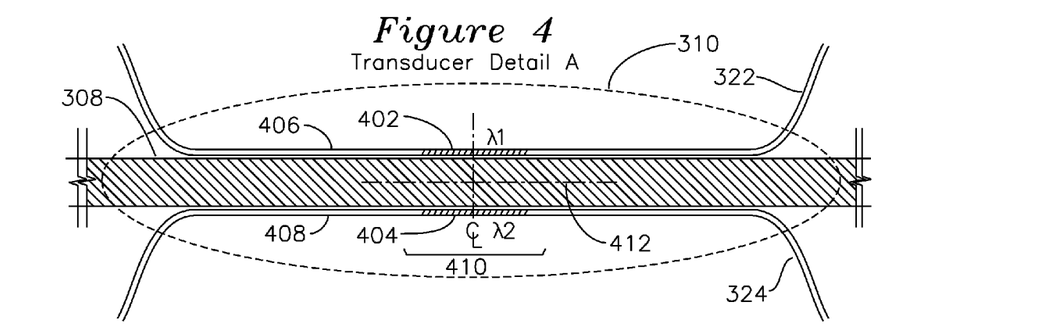
FIG. 4 shows a detailed view of the pressure transducer of FIG. 3.

FIG. 4 shows a detailed view of region 310 of FIG. 3. First fiber 322 is attached to one surface of substrate 308, and second fiber 324 is attached to the opposite surface of substrate 308 and in the same region and grating orientation. First fiber Bragg grating 402 is preferably placed over a centerline region 410 of the substrate, which is an area of maximum sensitivity, and second fiber Bragg grating 404 is placed on the opposite surface and an equal distance from centerline 412 of the substrate 308. The attachment of grating 402 and 404 to the substrate 308 may be achieved using any method which minimizes or eliminates hysteresis, and may include metallization of the exterior surface of the fibers 322, 324 for subsequent metallic bonding to the substrate 308 using high temperature structural adhesives, or placing the fiber into a groove in the substrate 308 for mechanical attachment. Any means of attachment of the grating zone of the fiber to the substrate which provides for coupling of the deflection of the substrate into a wavelength shift of the grating while minimizing creep would provide for satisfactory operation according to the objects of the invention. Additionally, any prior art means for sealing the region 302 or 304 where fibers 322 and 324 penetrate enclosure 306 is required for satisfactory device operation. Many such sealing techniques are available including a pressurized-side gasket fitting into a conical counterbore, where the seal is driven deeper into the conical counterbore surrounding the fiber by pressure in the enclosure 302, and the sealed fiber exit port would be located in a region of the enclosure 306 which would not interfere with the operation of the substrate 308.

Figure 5:
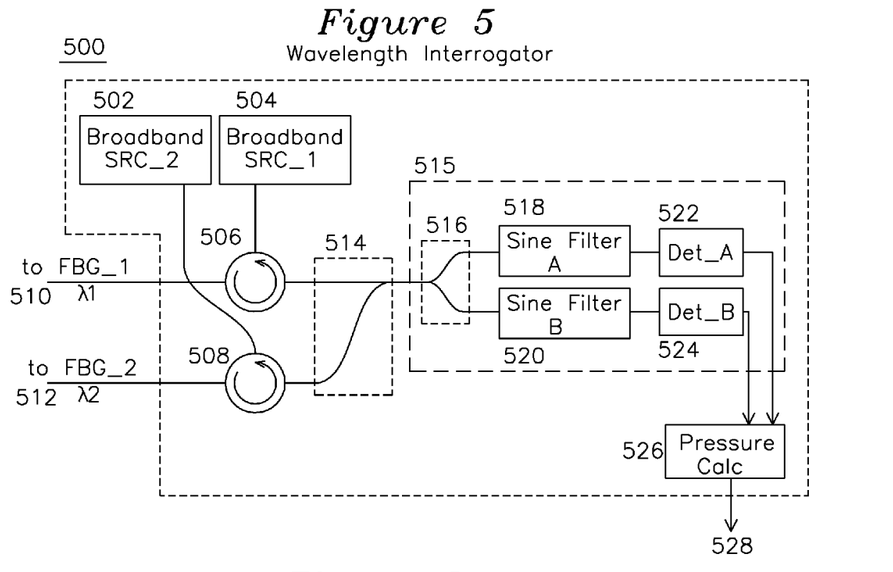
FIG. 5 shows a block diagram for a wavelength interrogator.

FIG. 5 shows one embodiment of a separate sensor wavelength interrogator for use in the separate fiber sensor system of FIG. 3. During a first measurement interval of arbitrary time duration, a first broadband source SRC_1 504 is enabled with second broadband source SRC_2 502 disabled, and during the first measurement interval, SRC_1 couples optical energy through circulator 506 to the first fiber Bragg grating strain sensor (operative initially at $\lambda 1$), and narrowband reflected energy (initially at $\lambda 1$) from the first sensor is coupled through circulator 506 to combiner 514 (with no optical energy returned from circulator 508 as SRC_2 502 is not enabled during the interval that SRC_1 is enabled), which couples optical energy into wavelength detector 515 which in one embodiment includes a splitter 516 and to a means for discriminating wavelength such as sine filter A 518 and sine filter B 520, which are coupled to first detector DET_A 522 and second detector DET_B 524, respectively. The output from the two detectors are fed to a pressure calculator 526 which computes the pressure from the amplitude responses (the amplitudes presented to the detectors derived from the wavelength-dependent transfer function of the sine filter), of the two detectors DET_A 522 and DET_B 524. During a second measurement interval of arbitrary time duration following the first measurement interval, the first source SRC_1 504 is disabled and the second broadband source SRC_2 504 is enabled. During the second measurement interval, the second circulator 508 couples broadband optical energy to the second fiber Bragg grating strain sensor (operative initially at $\lambda 2$) through bidirectional port 512, and narrowband optical energy (initially at $\lambda 2$) reflected from the second sensor is coupled through circulator 508, through combiner 514, and to wavelength detector 515, through splitter 516, and to first sine filter 518 and second sine filter 520, which generate optical outputs related to wavelength as will be described for FIG. 6, and the optical outputs of sine filters 518 and 520 are converted to an electrical signal by first detector 522 and second detector 524, after which the electrical outputs of first and second detectors 522 and 524 are converted to a pressure measurement using pressure calculator 526. The first time interval and second time interval are typically established from the time-of-flight interval for the reflected wavelength from the strain sensor fiber Bragg grating to reach the interrogator, and for the detectors to respond thereafter. For a broadband source illuminating the fiber Bragg gratings, it is possible for a wavelength interrogator separated from the measurement gratings by a 10 km fiber length, with an index of refraction of 1.48 for the fiber core (resulting in a 97 us round-trip delay), and a detector with a 2 us response, to therefore operate at a repetition rate of up to 10,000 unambiguous samples per second. In this manner, the repetition rate for any length of fiber and detector response time can be calculated.

Figure 6:
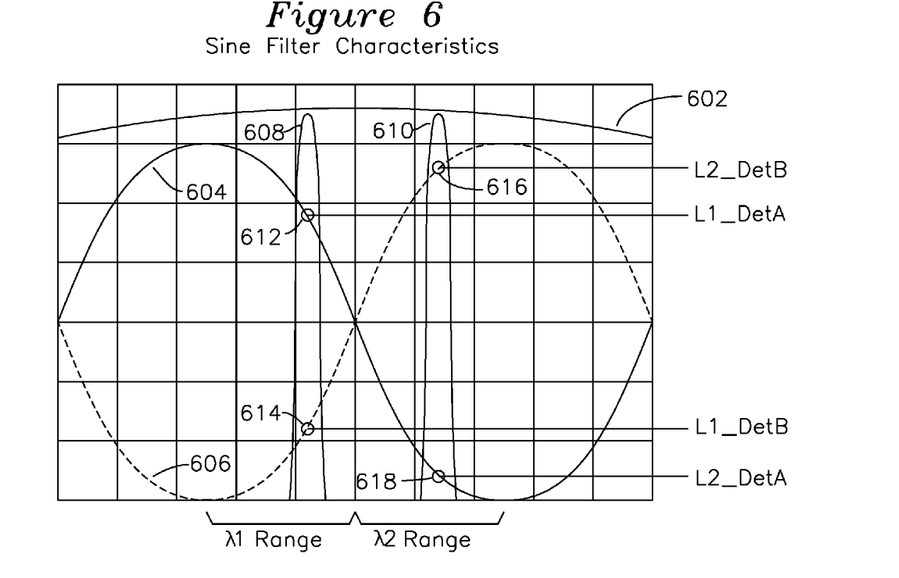
FIG. 6 is a plot of an excitation source with wavelength responses which are to be applied to a sine optical filter and detector.

FIG. 6 shows the characteristics of the first sine filter (SINE_A) 604 (of filter 518 of FIG. 5) and second sine filter (SINE_B) 606 (of filter 520 of FIG. 5), as well as the broadband source 602 (of source 502 or 504 of FIG. 5). A reflected optical signal from a fiber Bragg grating sensor at a first wavelength λ1 608 produces an output L1_DetA at response point 612 with the first sine characteristic 604 and L1_DetB 614 from the second sine characteristic 606. An optical signal at a second wavelength λ2 610 generates a first sine characteristic 604 output L2_DetA 618 and second sine filter characteristic 606 output L2_DetB 616.

Figure 11:
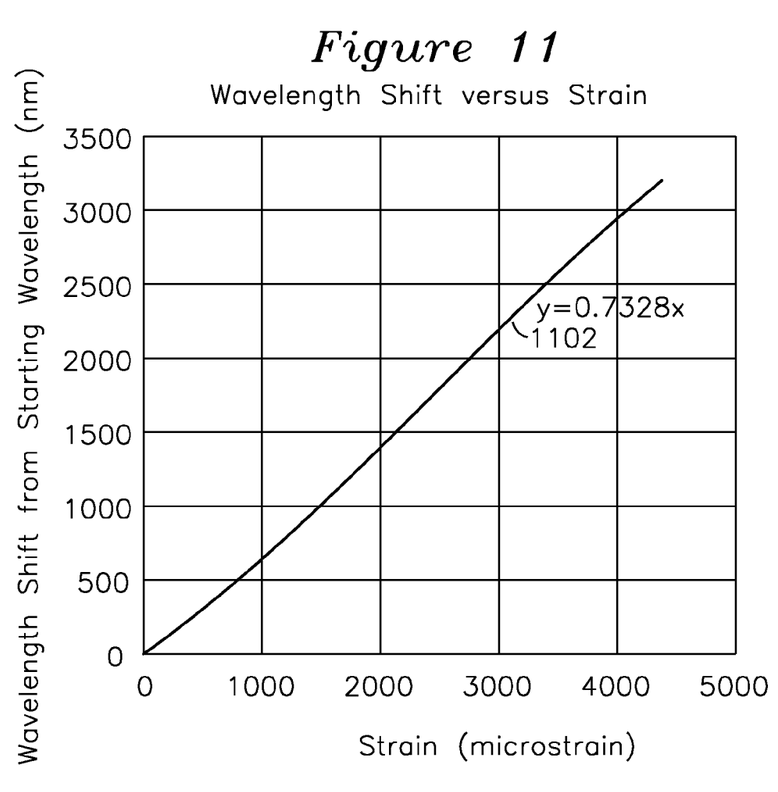
FIG. 11 shows a response plot for a fiber Bragg grating.

FIG. 11 shows a wavelength shift characteristics (Y axis) of a fiber Bragg grating having a strain applied (X axis). The wavelength shift is shown with reference to an unspecified starting wavelength associated with the unstressed fiber Bragg grating after mounting into a surface such as the substrate 308 of FIG. 4. The relationship between wavelength shift and fiber Bragg grating strain can be described as a linear equation, shown for FIG. 11 as Y=0.7328X (ignoring temperature effects for simplicity of illustration).

In a linear system, an increased pressure at port 312 of FIG. 3 causes grating 404 of corresponding FIG. 4 to stretch and grating 402 to compress. Additionally, the two gratings are each responsive to a temperature, as expressed below:

$$\lambda 1 = L1 - C1*P + K1*T$$

$$\lambda 2 = L2 + C2*P + K2*T$$

Ideally, if the coefficient of temperature response K is matched between the two fibers such that K1=K2=K, and the coefficient of pressure response C is matched between the two fibers such that C1=C2=C, and first grating 402 has an unstressed or starting reflection wavelength of L1, and second grating 404 has an unstressed or starting reflection wavelength of L2, the system of equations which govern the system is:

$$\lambda 1 = L1 - C*P + K*T$$

$$\lambda 2 = L2 + C*P + K*T$$

and calculated pressure is therefore:

$$P = \{(\lambda 2 - \lambda 1) + (L1 - L2)\}/2C \qquad (Eq.\ 1)$$

wherein the temperature dependence drops out. For a more typical case where K1≠K2 and C1≠C2, the governing system of equations would be:

$$P = (\{[\lambda 2 - \lambda 1] + [(K1 - K2)*T]\} + \{L1 - L2\})/(C2 + C1) \qquad (Eq.\ 2)$$

$$T = (\{[\lambda 2 - \lambda 1] - [(C1 + C2)*P]\} + \{L1 - L2\})/(K2 - K1) \qquad (Eq.\ 3)$$

From the above relationships, it can be seen that the pressure and temperature can be derived from the two wavelength measurements, when coupled with independent constant temperature and constant pressure calibration profiles, respectively.

In a preferred embodiment of the invention, the reflection wavelengths λ1 and λ2 are distinct and non-overlapping over the combinations of temperature and pressure, as shown in the x-axis of FIG. 6 corresponding to a single cycle of sine filter response for uniqueness of y-axis response. This may be expressed as the following criteria:

1) $\lambda 2 > \lambda 1$ such that $(\lambda 2 - \lambda 1) = |\lambda 2 \lambda 1|$
2) $\lambda 2$ and $\lambda 1$ are always in non-overlapping ranges.

There are several motivations for the best mode of non-overlapping ranges of wavelengths produced by the pair of fiber Bragg gratings of a particular pressure transducer. One motivation is to provide a clear association between a particular response wavelength and a given sensor FBG, such that λ1 and λ2 are not indeterminate in the equations. Another advantage of using separate wavelength response ranges is to prevent the "shadowing" of a downstream reflection-mode sensor or additive superposition of a downstream transmission-mode sensor, which would cause two sensors responses to appear as a single sensor response. While it is possible to operate the two sensors in overlapping ranges, a disadvantage is the inability of the wavelength discriminator to distinguish between a single sensor response caused by two separate sensors operating in the same wavelength and a failure in the fiber which interconnects the two FBG sensors, resulting in a single sensor reflection response. By tracking each sensor response for association to a particular sensor, and detection of same-wavelength sensor response, it is possible for the two sensors to operate in overlapping response ranges.

Figure 7:
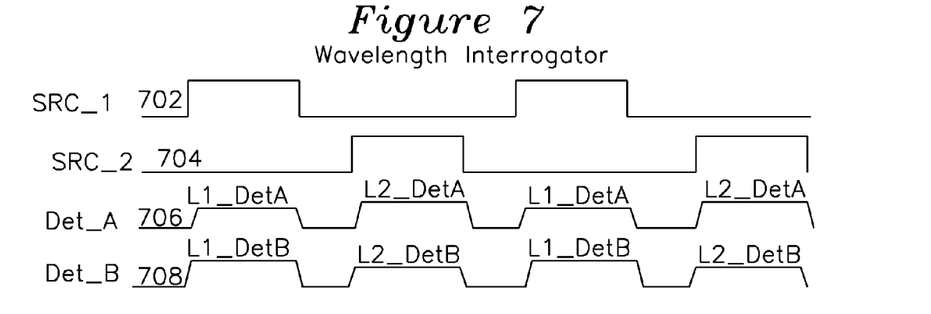
FIG. 7 shows the waveforms for a wavelength interrogator.

FIG. 7 shows a timing sequence diagram for the operation of the wavelength interrogator of FIG. 5. Waveform 702 shows the sequence of first broadband source SRC_1 measurements during a first interval previously described interleaved with a second broadband source SRC_2 which is enabled during a second interval of time. Each detector DetA and DetB generates part of the differential output which can be concurrently read and converted into a pair of values and converted thereafter by pressure calculator 526 into a pressure value 528, such as the use of stored pre-deployment calibration data profiles which converts sensed pressure P as that of Equations 1 or 2 into corrected pressure.

Figure 8A:
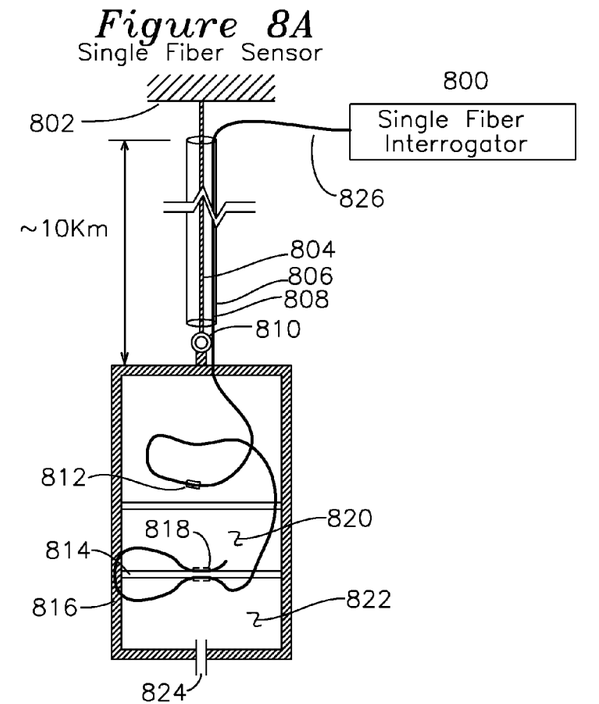
FIG. 8A shows a cross section view of a single fiber sensor.

FIG. 8A shows a single fiber pressure sensor having a pressure chamber 822 coupled to a pressure to be measured through aperture 824 which provides deflection of a substrate 814 having fiber Bragg gratings applied on opposite sides in region 818, as was shown for FIGS. 3 and 4. The sensor of FIG. 8A has the top and bottom sensors tied together in series such that the two fiber Bragg grating sensors are formed onto a single optical fiber 808 in conduit 806 which is also housing a support cable 804 tied to a support 802 on one end, and the pressure transducer enclosure 816 on the other end. The optical fiber 808 and support cable 804 may have any length, shown as 10 km, and the end of fiber 808 opposite to sensor region 818 is coupled at port 826 to a single fiber interrogator 800.

Figure 8B:
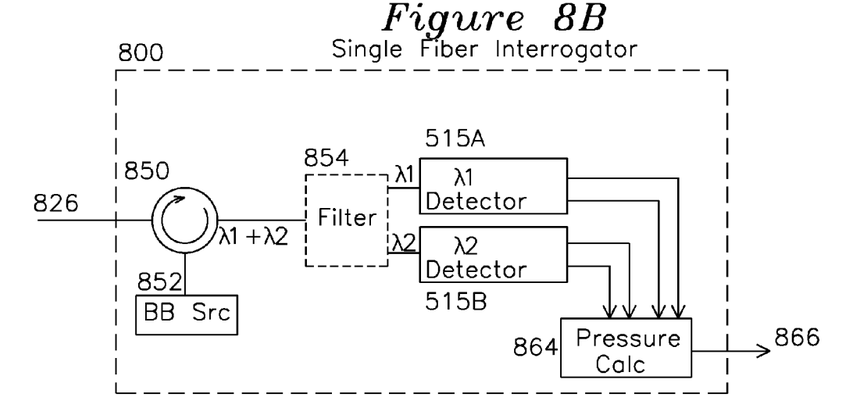
FIG. 8B shows the block diagram of a wavelength interrogator for use with the sensor of FIG. 8A.

FIG. 8B shows an example embodiment of a single fiber interrogator 800. A broadband source 852, which may operate continuously, couples broadband optical power to circulator 850, which couples broadband optical power to port 826, and to the gratings in region 818 of FIG. 8A which reflect superimposed optical energy as λ1 and λ2 through circulator 850 and to filter 854, which splits the wavelengths from each reflection grating into separate channels and provides each to wavelength detectors 515A and 515B which are each operative such as was described for 515 of FIG. 5, and which may operate according to the wavelength discrimination principles described in FIG. 6. The pressure calculator 864 which receives the detected wavelengths for each sensor may perform the pressure and temperature calculations based on Equations 1, 2, or 3, in combination with stored calibration data, or any other means for converting measured wavelengths into pressure and temperature. Additional measurement channels may be added by placing additional sensors which are operative within unique wavelengths which also couple out of filter 854 and are coupled to additional wavelength detectors 515C, 515D, etc (not shown) operative at each unique wavelength to detect additional measurement phenomenon such as optional temperature sensor 812 of FIG. 8A.

Figure 9A:
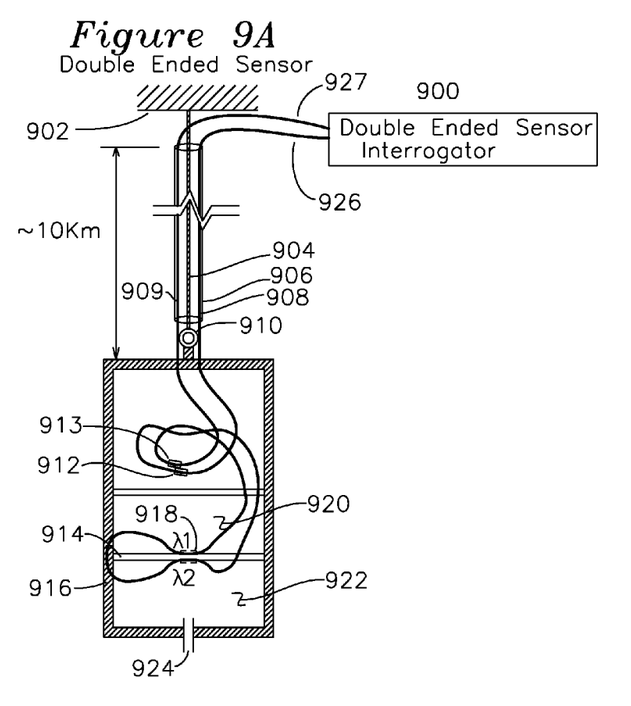
FIG. 9A shows a cross section view of a dual operation fiber sensor, for use with either the redundant interrogator of FIG. 9B or transmission interrogator of FIG. 9C.

FIG. 9A shows a diagram for a double ended sensor, which may be operated in at least two configurations. A redundant configuration which protects against a fiber failure provides redundancy protection and is used with reflection gratings on opposite surfaces of substrate 914 in region 918 using the interrogator of FIG. 9B. An alternative use of the double ended sensor of FIG. 9A is a non-redundant configuration with transmission mode fiber Bragg gratings on opposite substrate surfaces and located in region 918 and using the interrogator of FIG. 9C. For either mode of operation, the pressure transducer has a housing 916 with a sealed substrate 914 forming a pressure chamber coupled to a pressure source through aperture 924, and the gratings are located in region 918, as was described previously.

Figure 9B:
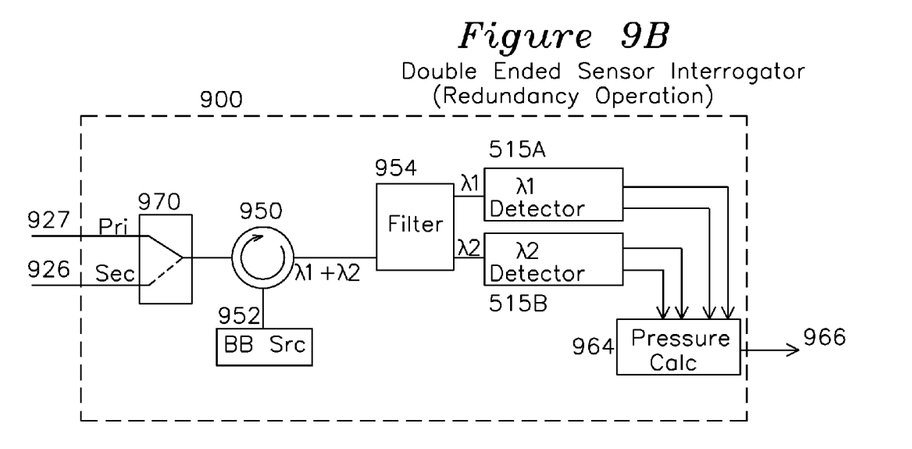
FIG. 9B shows the block diagram for a redundant interrogator for use with the sensor of FIG. 9A.

FIG. 9B shows dual ended sensor interrogator 900 for redundancy operation, where the interrogator can recover from a break in one of the two optical fibers 908 and 909 which travel in the conduit 906. Broadband source 952 is coupled to either a first (primary) optical fiber 927, or to a second (secondary) optical fiber 926 as selected by optical switch 970. The first and second fibers of FIG. 9A are coupled to reflection mode fiber Bragg gratings, which return optical energy at a first and second wavelength, respectively. The reflected optical energy is coupled through circulator 950 to wavelength filter 954, which separates and delivers the response wavelengths to a first wavelength detector 515A and second wavelength detector 515B, which are coupled to pressure calculator 964. Wavelength detectors 515A and 515B also detect the absence of reflected optical energy from a first fiber 927, such as from a fiber break, which causes optical switch 970 to deselect primary fiber 927 and select secondary fiber 926 for coupling to broadband source 952 and which also directs reflected optical energy through circulator 950 to filter 954. As the order of the first grating or second grating along the fiber path does not affect the reflected optical energy, by virtue of their unique operating ranges, either the first optical fiber 927, or second optical fiber 926 may be exclusively selected by optical switch 970.

Figure 9C:
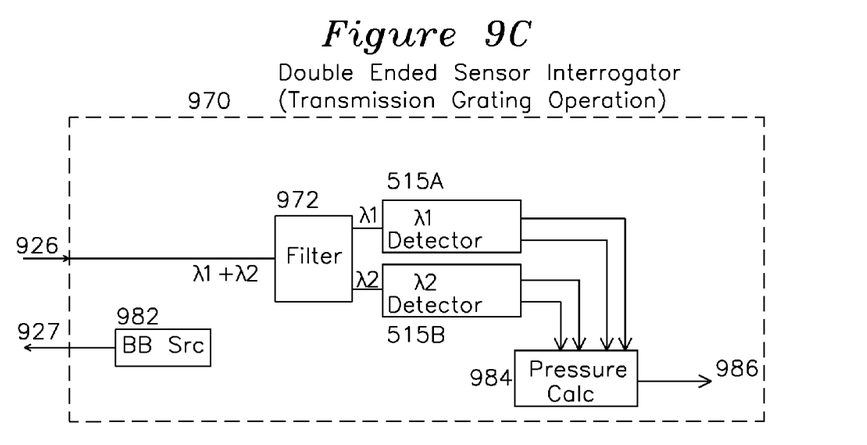
FIG. 9C shows the block diagram for a transmission interrogator for use with the sensor of FIG. 9A.

FIG. 9C shows a double ended sensor interrogator operating with transmission fiber Bragg gratings for use with the double ended sensor of FIG. 9A where gratings in region 918 are utilized in transmission mode with co-propagating fiber Bragg grating wavelength signals. For this type of operation, a broadband optical source 982 is coupled to one of the optical fibers 927, and the other optical fiber 926 contains a superposition of the wavelengths associated with the first and second gratings. As was described previously, the wavelength filter 972 separates them into two bands, which are resolved into particular wavelengths by wavelength detectors 515A and 515B, as was described previously, and fed to pressure calculator 984 to generate computed pressure 986.

Figure 10:
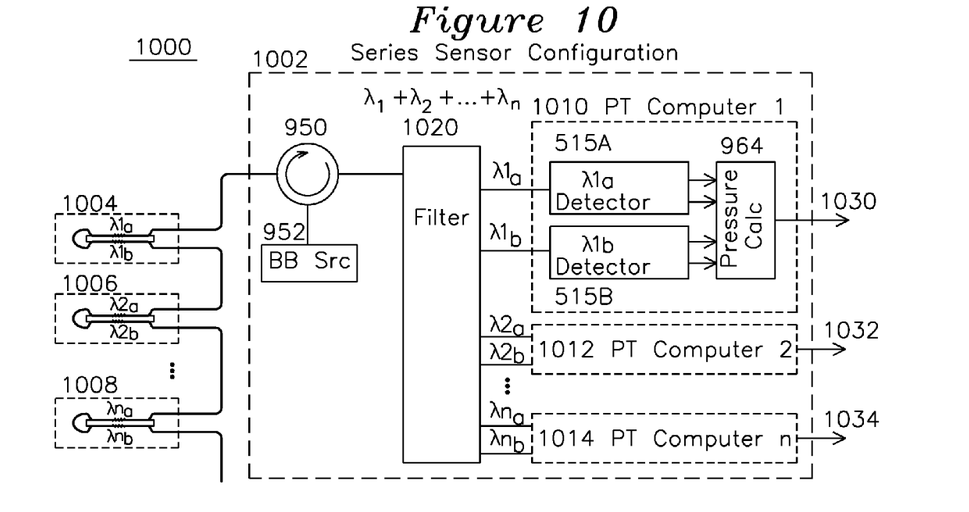
FIG. 10 shows the block diagram for a pressure transducer having multiple sensors.

In another embodiment shown in FIG. 10, a plurality of n pressure transducers 1004, 1006, ..., 1008, each functioning as previously described for FIGS. 3 and 4, may be placed in a series configuration, with each pressure transducer generating respective optical responses $\lambda 1a$ and $\lambda 1b$ of sensor 1004, $\lambda 2a$ and $\lambda 2b$ of sensor 1006, and $\lambda na$ and $\lambda nb$ of sensor 1004. Filter 1020 separates the wavelength pairs associated with each particular pressure transducer, and applies this to a respective pressure/temperature computer 1010, 1012, and 1014, each of which computes the pressure for a particular transducer. In this manner, the wavelengths of each of the pressure transducers are received by a single wavelength interrogator 1002 which separates the wavelengths associated with each sensor 1004, 1006, 1008 and computes for each pressure transducer a respective pressure and temperature measurement. The wavelength interrogator of FIG. 10 shows the use of reflection fiber Bragg gratings with a multi-channel interrogator, and it is possible to combine the series transducer configuration of FIG. 10 with the double-ended multi-channel interrogator of FIG. 9B modified to provide multi-channel response by replacing the filter 954 and successive components of FIG. 9B with the filter 1020 and successive components of FIG. 10. In another embodiment, a plurality of pressure transducers are connected in series, with each pressure transducer having a pair of transmission fiber Bragg gratings. The optical fibers on opposite ends of the series string of transducers can be coupled to a modified multi-channel sensor of FIG. 9C, where the filter 972 is replaced by the filter 1020 and following components, each of which is coupled to a pressure/transducer computer for each respective pressure transducer 1004, 1006, 1008 operative using transmission fiber Bragg gratings.

The examples provided herein are for illustration only, and are not intended to limit the invention to only the particular embodiments used for explanation.

We claim:
1. A pressure sensor having:
an enclosure having an inlet and a substantially planar substrate;
said substrate having a first optical fiber with a first fiber Bragg grating attached to a sensing region of said planar substrate, said first fiber Bragg grating having a first wavelength response;
a second optical fiber with a second fiber Bragg grating attached to a sensing region opposite said first optical fiber Bragg grating sensing region, said first optical fiber sensing region and said second optical fiber sensing region being coupled to each other for deflection changes and thermal changes, said second fiber Bragg grating having a second wavelength response;
where an application of pressure causes said substrate to deflect, thereby decreasing said first fiber Bragg grating response wavelength and correspondingly increasing said second fiber Bragg grating response wavelength.

2. The pressure sensor of claim 1 where at least one said first fiber Bragg grating wavelength response or at least one said second fiber Bragg grating wavelength response is a reflection response counter-propagating in the direction of an excitation to said fiber Bragg grating.

3. The pressure sensor of claim 1 where at least one said first fiber Bragg grating response or at least one said second fiber Bragg grating response is a transmission response co-propagating in the direction of an excitation to said fiber Bragg grating.

4. The pressure sensor of claim 1 where said first fiber Bragg grating and said second fiber Bragg grating are coupled to a wavelength detector using separate optical fibers which are optically isolated from each other.

5. The pressure sensor of claim 1 where said first fiber Bragg grating and said second fiber Bragg grating are in series with each other by coupling said first optical fiber to said second optical fiber, each said fiber Bragg grating reflecting a unique wavelength range, said reflected response counter-propagating with respect to a broadband source coupled to an end of said first optical fiber or to an end of said second optical fiber.

6. The pressure sensor of claim 1 where said first fiber Bragg grating and said second fiber Bragg grating are in series with each other, the remaining ends of each said first fiber Bragg grating and said second fiber Bragg grating coupled to a respective first optical fiber and a second optical fiber;
said first optical fiber coupled to a wavelength interrogator first port and said second optical fiber coupled to a wavelength interrogator second port;
where said wavelength interrogator is operative in a normal mode where said wavelength interrogator couples a broadband optical source to said first optical fiber and optical energy reflected from said first fiber Bragg grating and said second fiber Bragg grating counter-propagates back to a wavelength detector, and said wavelength interrogator is operative in a redundant mode when reflected optical energy in normal mode is not detected, whereby said redundant mode causes broadband optical energy to be directed to said second optical fiber, and counter-propagating reflections from said first fiber Bragg grating and said second fiber Bragg grating are directed back to said wavelength detector.

7. The pressure sensor of claim 1 where said first fiber Bragg grating and said second fiber Bragg grating are in series with each other, the remaining ends of each said first fiber Bragg grating and said second fiber Bragg grating coupled to a respective first optical fiber and a second optical fiber;
said first optical fiber coupled to a source of broadband optical energy;
said second optical fiber coupled to a wavelength detector, and said first fiber Bragg grating and said second fiber Bragg grating is operative in a transmission mode whereby optical energy co-propagates with said broadband source optical energy.

8. The pressure sensor of claim 1 where said application of pressure is the coupling of a first pressure to be measured to one side of said substrate and a reference pressure to the opposite side of said substrate.

9. The pressure sensor of claim 1 where said application of pressure is the coupling of a first pressure to be measured to one side of said substrate and the coupling of a second pressure to be measured to the opposite side of said substrate.

10. A method for measuring pressure applied to a substrate having a first surface and also a second surface opposite said first surface, the method operative on a first optical fiber with a fiber Bragg grating attached to said first surface and a second optical fiber having a fiber Bragg grating attached to said second surface, said first surface and said second surface deflecting in the presence of an applied pressure, the method having:
a first step of application of a pressure to said substrate sufficient to cause a decrease in the reflected or transmitted wavelength of said first optical fiber Bragg grating and a corresponding increase in the reflected or transmitted wavelength of said second optical fiber Bragg grating;
a second step of measuring said decreased first grating wavelength and said correspondingly increased second grating wavelength;
a third step of converting said first optical grating decreased wavelength and said second optical grating correspondingly increased wavelength into a pressure measurement, and optionally, a temperature measurement.

11. The method of claim 10 where said first grating has a starting wavelength of $L1$, said second grating has a starting wavelength of $L2$, said first and second gratings have coefficients of pressure $C1$ and $C2$, respectively, and coefficients of temperature $K1$ and $K2$, respectively, said $C1$ substantially matched to said $C2$, and said $K1$ substantially matched to said $K2$.

12. The method of claim 10 where said third step includes deriving said pressure and temperature from $$P=(\{[\lambda 2-\lambda 1]+[(K1-K2)*T]\}+\{L1-L2\})/(C2+C1) \text{ and}$$

$$T=(\{[\lambda 2-\lambda 1]-[(C1+C2)*P]\}+\{L1-L2\})/(K2-K1),$$

where:
$C1$ and $C2$ are coefficients of pressure for said first and said second fiber Bragg grating, respectively;
$K1$ and $K2$ are coefficients of temperature for said first and said second fiber Bragg gratings, respectively.

13. The method of claim 11 where said $K1$ is substantially equal to said $K2$, and said third step includes deriving said pressure from $$P=\{(\lambda 2-\lambda 1)+(L1-L2)\}/(C2+C1).$$

14. A pressure sensor system having:
a substrate in an enclosed chamber and coupled to a source of pressure;
a first optical fiber having a fiber Bragg grating and attached to a sensing region of said substrate;
a second optical fiber having a fiber Bragg grating and attached to a surface which is opposite to said first optical fiber sensing region;
an optical interrogator providing broadband excitation to said first fiber Bragg grating and said second fiber Bragg grating, said optical interrogator determining a pressure and optionally a temperature from a said first fiber Bragg grating and said second fiber Bragg grating responses.

15. The pressure sensor of claim 14 where said first fiber Bragg grating and said second fiber Bragg grating are reflection or transmission gratings.

16. The pressure sensor of claim 14 where said enclosed chamber coupled to a source of pressure is the coupling of a first pressure to be measured to one side of said substrate and a reference pressure to the opposite side of said substrate.

17. The pressure sensor of claim 14 where said enclosed chamber coupled to a source of pressure is the coupling of a first pressure to be measured to one side of said substrate and the coupling of a second pressure to be measured to the opposite side of said substrate.

18. A pressure sensor system having a series configuration of two or more pressure sensors, each said pressure sensor having a first optical fiber and a second optical fiber;
each said pressure sensor having:
a substrate in an enclosed chamber and coupled to a source of pressure;
said first optical fiber having a fiber Bragg grating and attached to a sensing region of said substrate;
said second optical fiber having a fiber Bragg grating and attached to a sensing region which is on an opposite surface from said first optical fiber sensing region;

said first optical fiber sensing region and said second optical fiber sensing region of said substrate are both responsive to an applied pressure;

said first optical fiber coupled to said second optical fiber;

each said pressure sensor fiber Bragg grating providing a unique response from any other said fiber Bragg grating;

an optical interrogator providing broadband excitation to said first optical fiber of said series configuration of pressure sensors, said optical interrogator receiving Bragg grating responses from said first optical fiber or from said second optical fiber, said optical interrogator determining a pressure and optionally a temperature for each respective pressure sensor from the Bragg grating responses from each said pressure sensor.

* * * * *